Dec. 1, 1970  A. W. BRIGHT  3,544,194
ELECTRO-DIALYSIS KERR CELLS
Filed April 8, 1968  4 Sheets-Sheet 1
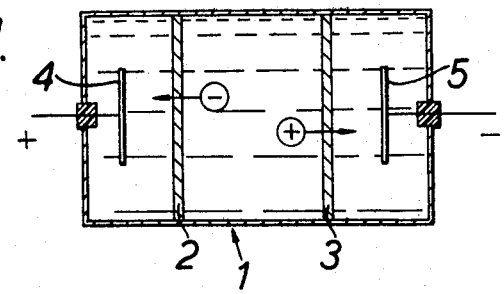
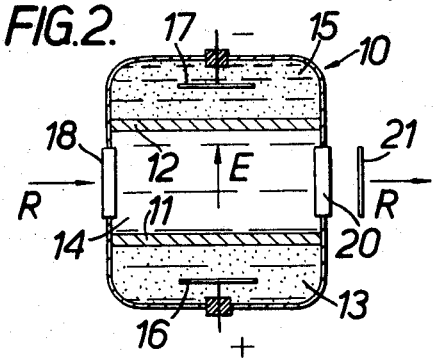
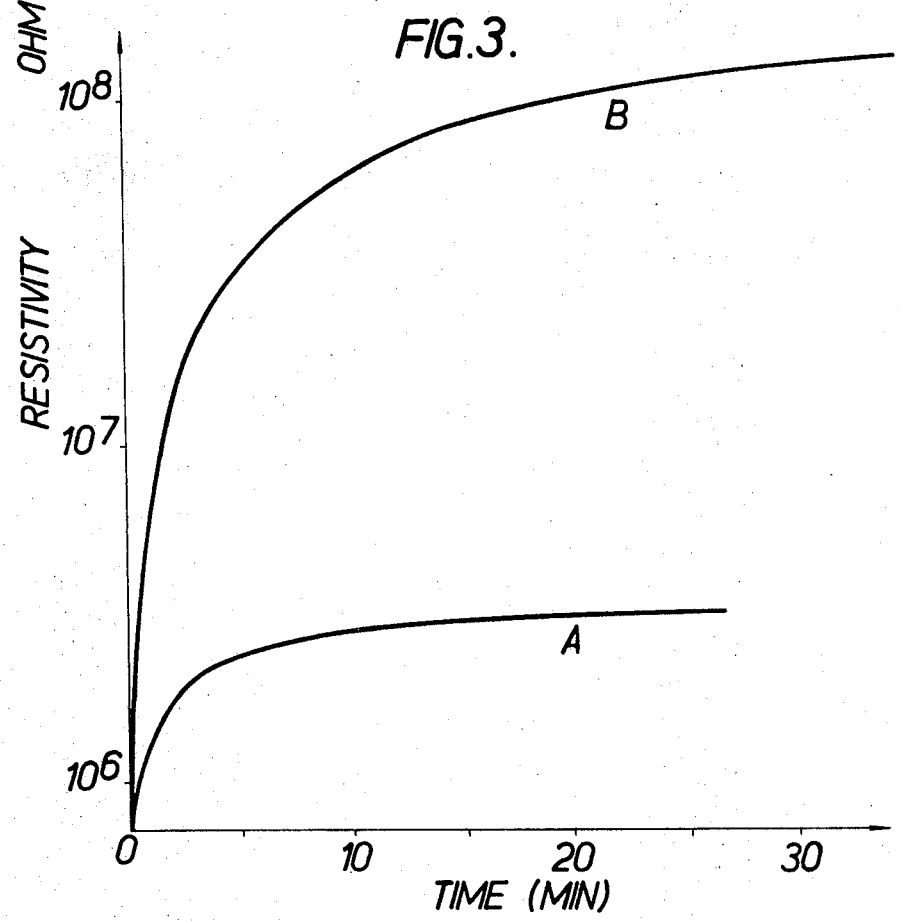

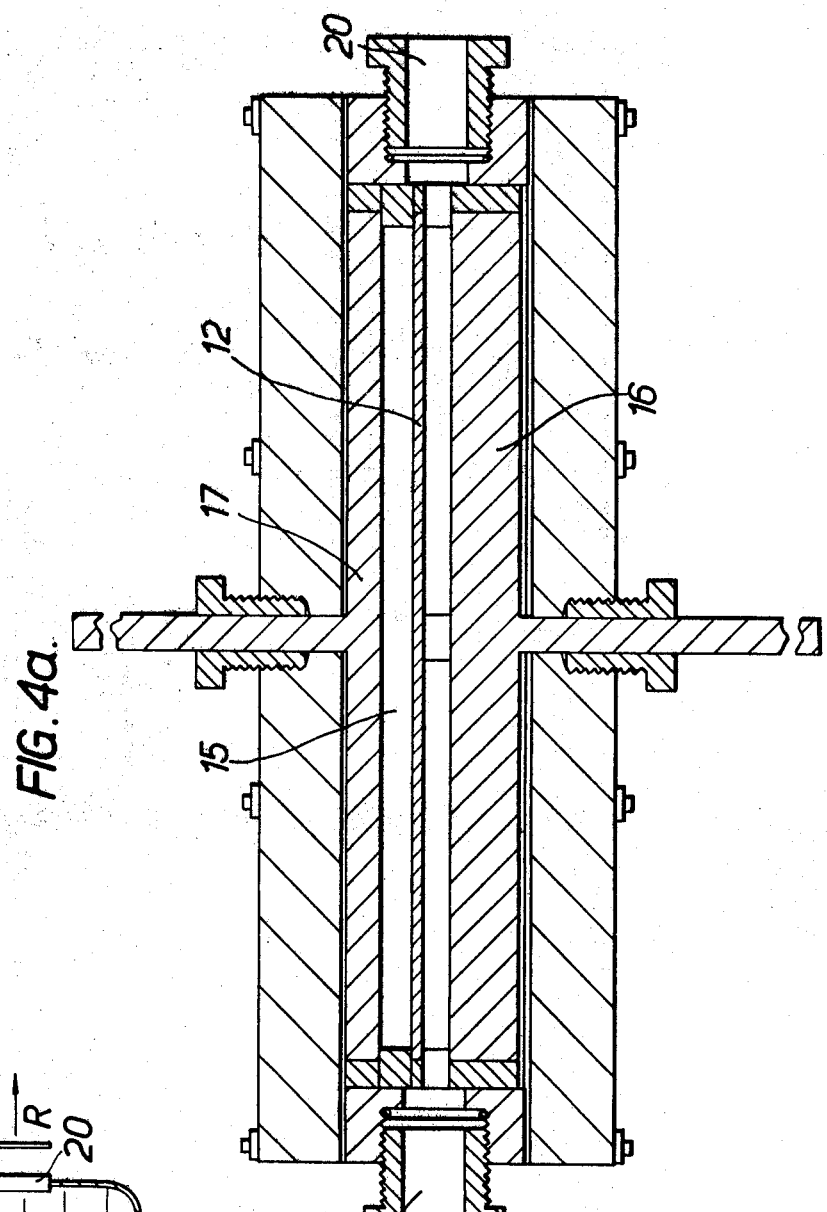
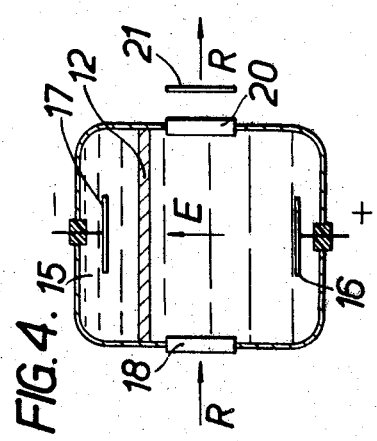

Dec. 1, 1970     A. W. BRIGHT     3,544,194

ELECTRO-DIALYSIS KERR CELLS

Filed April 8, 1968     4 Sheets-Sheet 4

United States Patent Office

3,544,194
Patented Dec. 1, 1970

3,544,194
ELECTRO-DIALYSIS KERR CELLS
Alfred William Bright, Southampton, England, assignor to National Research Development Corporation, London, England, a British corporation
Filed Apr. 8, 1968, Ser. No. 719,393
Claims priority, application Great Britain, Apr. 18, 1967, 17,854/67
Int. Cl. G02f 1/26
U.S. Cl. 350—150                                12 Claims

ABSTRACT OF THE DISCLOSURE

An electro-dialysis Kerr cell has two spaced apart electrodes at least one of which is substantially surrounded by ion exchange material, and at least one permeable member separating an inter-electrode space in the cell from said ion exchange material.

---

This invention comprises improvements in or relating to electro-dialysis Kerr cells.

Electro-dialysis may be defined as the selective removal of ions from a liquid by selectively permeable or "permselective" material under the influence of an applied electrical field. Conventional electro-dialysis cells employ membranes formed of, or including, ion exchange material. Impurity ions in the liquid associate with the ion exchange material and become "trapped" in the membrane. In use of such cells, the membranes tend to become contaminated, leading to loss of efficiency. Moreover, when high electrical fields are applied the resulting mechanical forces on the membranes cause them to distort.

According to the present invention there is provided an electro-dialysis Kerr cell having therein two spaced apart electrodes at least one of which is contacted by ion exchange material, and at least one permeable member separating an inter-electrode space in the cell from said ion exchange material, said material being such that, when the cell is filled with a predetermined liquid which displays the Kerr electro-optical effect and contains impurity ions, and an electric field is established between the electrodes, de-ionisation of the liquid in said inter-electrode space is promoted, windows being provided in opposite walls of the cell for permitting the transmission through the electric field in the cell of a beam of polarised radiation to be modified by the Kerr electro-optical effect.

The Kerr cell according to the invention is potentially comparable in efficiency to Kerr cells employing membranes, but is not so prone to contamination and blockage by impurities, and is generally better suited to withstand high applied electric fields.

The ion exchange material may contact (e.g. may substantially surround) only one electrode i.e. either the cathode alone, or the anode alone.

Alternatively, ion exchange material may contact each electrode, the material at the electrode which in operation is of negative polarity being cationic and the material at the electrode which in operation is of positive polarity being anionic. This avoids field distortion effects, in cases where it is desired to modulate a relatively wide beam of light such that a relatively large fraction of the area of the cell windows is utilised.

The ion exchange material may comprise a plurality of synthetic resin members, such, for example, as resin beads of the type commonly used in water softeners. The, or each said permeable member, may be formed of sintered material such as, for example, sintered glass, sintered plastics material such as PTFE or porous plastics material such as porous polyethylene.

Figure 6:
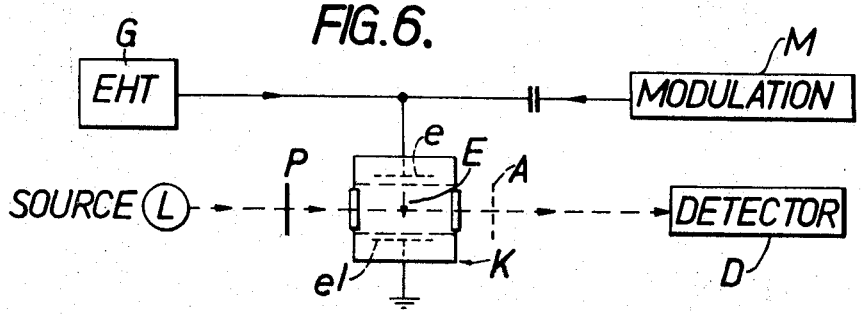

The Kerr cell according to the invention is capable of use with higher applied electric fields by virtue of the de-ionisation produced in the inter-electrode space. The Kerr effect is operative over a wide frequency range provided that the conductivity of the liquid is low enough. With nitrobenzene the response to impulse voltages is so rapid that Kerr cells have been used as shutters with exposure times of $10^{-7}$ second. With the new type of Kerr cell described in the present specification modulation frequencies from zero up to 10 mHz. or even higher could be used. One of the most important applications of the system described in this application is as a modulation system for optical communication purposes as shown in FIG. 6.

One application of the electro-dialysis Kerr cell referred to above is to apparatus for modulating a beam of polarised radiation. Such apparatus according to the invention comprises an electro-dialysis cell as referred to in the preceding paragraph, means for applying a steady voltage between the electrodes to provide a steady electric field in a liquid contained in the cell, the cell windows being arranged so that polarised radiation to be modulated can be transmitted through the liquid having its plane of polarisation at a predetermined angle to said field therein, and a modulation oscillator for superimposing on the steady voltage applied to the electrodes an oscillatory modulation voltage, whereby the radiation after transmission through the cell is polarisation-modulated.

For maximum effectiveness the angle between the plane of polarisation and the electric field should be about 45°. Thus in a modification of this apparatus a polarising device is disposed in the path of radiation entering the cell with its axis of polarisation inclined at 45° to the direction of the electric field in the cell, and an analyser device having its axis of polarisation perpendicular to that of the polarising device is disposed in the path of radiation leaving the cell, whereby the radiation transmitted through the analyser device in use of the apparatus is intensity-modulated. Without the analyser device the radiation leaving the cell would be polarisation-modulated and for some applications such, for example, as communication system, it might be preferable to use this type of modulation.

A further application of the Kerr cell is to high voltage control apparatus: such apparatus comprises an electro-dialysis Kerr cell in which the electrodes are adapted to be connected across a high voltage to be controlled, a source of plane polarised radiation arranged to direct radiation through liquid in the cell and having its plane of polarisation disposed at approximately 45° to the electric field therein, photo-electric detector means adapted to receive said radiation after transmission through the cell and through an analyser device the axis of polarisation of which is perpendicular to the plane of polarisation of the said radiation on entering the cell, and a voltage regulating circuit which is adapted in response to a change in the electrical output of the detector means to change the voltage applied to the said electrodes in a sense to cause an opposing change in the said electrical output. Said radiation source may be modulated so as to apply a predetermined fluctuation to the voltage to be controlled. Alternatively, the radiation source may be a steady source so that the regulating circuit stabilises the voltage to be controlled at a predetermined value.

The invention will be more particularly described, by way of example only, with reference to the accompanying drawings, in which:

FIG. 1 illustrates diagrammatically the principle of a known electro-dialysis cell.

Figure 5:
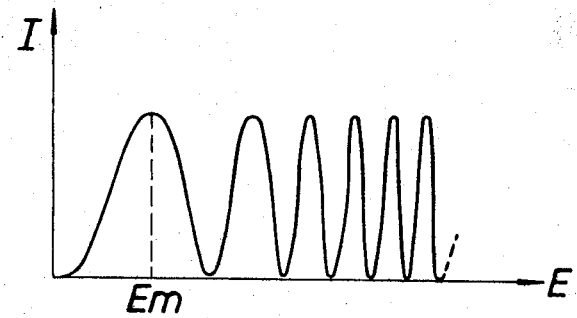
Figure 7:
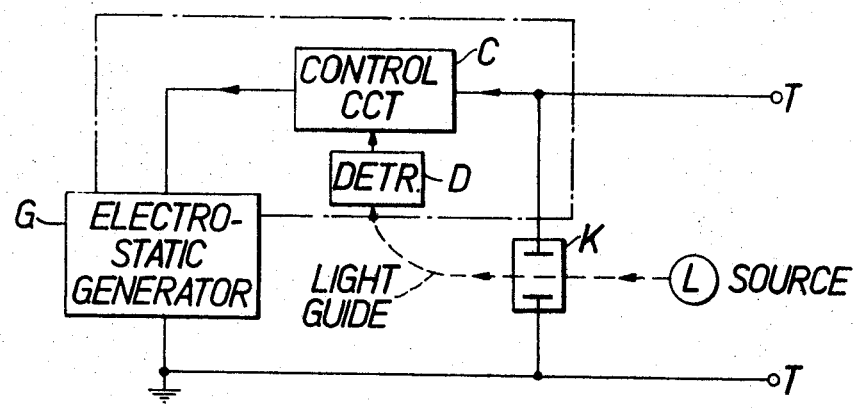
Figure 8:
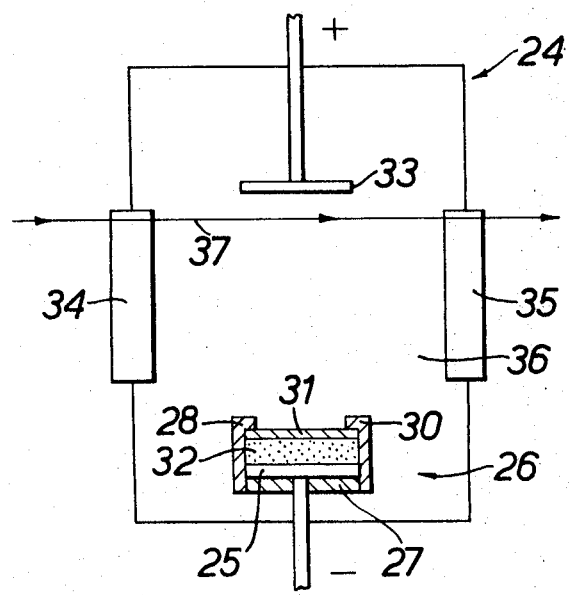
Figure 9:
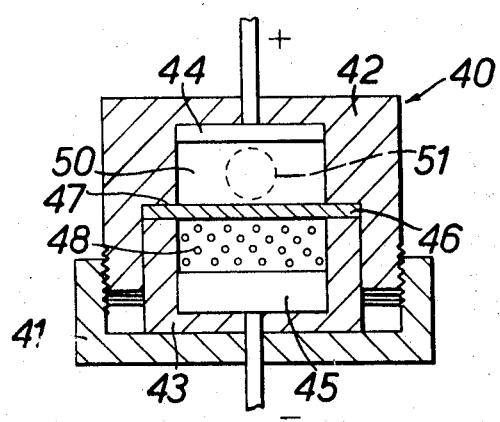

FIGS. 2 and 4 shown in diagrammatic section respective electro-dialysis Kerr cells according to two respective embodiments of the invention, FIG. 3 represents graphically the time-dependence of the resistivity of a liquid (nitrobenzene) contained in a cell according to the invention on application of an applied electric field, FIG. 4a is a sectional view of a practical embodiment of the cell shown in FIG. 4, FIG. 5 illustrates graphically the variation in intensity of radiation modulated using a Kerr cell, with varying applied electrical fields, FIG. 6 shows schematically an apparatus for modulating light according to one application of the invention, FIG. 7 shows schematically an apparatus for stabilising and/or controlling a high voltage according to a further application of the invention, and FIGS. 8 and 9 illustrate diagrammatically two alternative Kerr cells which may be used in the apparatus of FIG. 6.

Ion exchange in liquids has been used to remove ionic impurities from water using electro-dialysis. The technique has been used to produce de-ionisation in polar liquids other than water, using a known electro-dialysis cell, such as that shown diagrammatically in FIG. 1. A cell 1 containing the liquid to be de-ionised is divided into three compartments by two ion exchange membranes 2, 3 disposed respectively adjacent an anode 4 and a cathode 5 at opposite ends of the cell 1. The membrane 2 is formed of anionic and the membrane 3 of cationic material.

When a voltage is applied between the anode 4 and cathode 5 ion exchange takes place at the ion-exchange membranes 2, 3, ions in the liquid being exchanged for ions contained in the membranes.

An example of an ion exchange process can be given for the case of weak sodium chloride (NaCl) aqueous solution reacting with a strongly acidic cation exchange material having an active sulphonic acid group (SO$_3$H) which exists in the hydrogen form. The NaCl dissociates and a sodium (Na$^+$) ion reacts as follows:

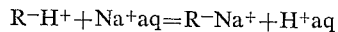

where R$^-$ represents one equivalent of the ion exchange material such as RSO$_3^-$.

The sodium ion is retained by the ion exchange material and the hydrogen ion released. The corresponding reaction for a strongly basic anion exchange material would be:

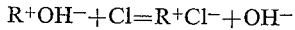

By using the two ion exchange membranes 2, 3 under certain conditions the H$^+$ and OH$^-$ ions may recombine to produce water in an equilibrium reaction.

When an electric field is established across the cell 1 ionic impurities are swept into the two outer compartments and low conductivity deionised liquid is obtained in the centre compartment. An examination of the voltage distribution across the cell 1 shows that over 99% of the voltage is developed across the liquid in the centre compartment, so that it is possible to achieve fields of 10$^7$ v./m. between the two membranes 2, 3.

The cell 1 of FIG. 1 is, however, subject to parasitic-electric field fluctuations in use due to changes in conductivity of the liquid in the centre compartment, due to the conduction mechanism at the membrane. Moreover, the application of high voltages across the electrodes 4, 5 results in high electrical fields which develop distorting forces on the membranes 2, 3. A further disadvantage associated with the type of cell is that purification of the membranes 2, 3 after they have become contaminated with impurity ions is difficult. Moreover, the membranes 2, 3 have a limited operating life because of their relatively small capacity for impurity ions. The membranes 2, 3 are, furthermore, relatively fragile and liable to damage through inadvertent sparking. Damage, if it occurs, is usually irreversible.

According to the present invention an improved electro-dialysis Kerr cell 10 (FIG. 2) is provided in which the membranes of the cell shown in FIG. 1 are replaced by sintered glass filter plates 11, 12 which divided the cell into an anode compartment 13, a central compartment 14 and a cathode compartment 15. Anion exchange material surrounds an anode 16 in the anode compartment 13 and cation exchange material surrounds a cathode 17 in the cathode compartment.

The plates 11, 12 typically have porosity of 2, 3 or 4, corresponding to average pore sizes in the ranges 150–250, 100–120, and 40–60 microns respectively.

Although the plates 11, 12 are of sintered glass in this example porous plastic sintered membranes of the type used for electrodes in fuel cells could alternatively be used. Thus, for example, porous P.T.F.E. or polyethylene may be used.

The ion exchange material in the anode and cathode compartments 13, 15 comprises resin beads, those in the anode compartment 13 being of strongly basic anion resin and those in the cathode compartment 15 of strongly acidic cation resin, both resins being independent of pH value. Many different resin bases are available, including phenolic, polystyrene and acrylic bases. The size of the resin beads may, for example, be in the range 52 to 100 mesh approximately.

The cell 10 of FIG. 2 may be modified by removing one or other of the sintered glass plates 11, 12 and associated ion exchange beads, so that one of the electrodes, preferably the anode 16 is exposed to the central compartment 14; the exposed electrode should be made of inert metal such as stainless steel, platinum or the like.

When the entire cell 10 is filled with a polar liquid, which displays the Kerr electro-optical effect, care being taken to exclude trapped air from the sintered plates and to remove all water from the ion exchange beads, and a voltage is applied across the electrodes 16, 17, there is a migration of the positive and negative ions in the liquid towards the cathode 17 and anode 16 respectively.

The ion exchange beads are responsible for de-ionising the liquid passing through the respective sintered glass plates 11, 12. Larger non-ionic impurities are "trapped" in the pores of the plates 11, 12 which themselves act effectively as filters. The effect of the sintered plates 11, 12 and the ion exchange beads is illustrated graphically in FIG. 3, which shows the increasing resistivity (and therefore, purity) with time of nitrobenzene after applying a voltage to the cell 10, the lower curve A being in respect of a cell 10 having sintered plates 11, 12 but no ion exchange beads and the upper curve B in respect of a cell 10 having ion exchange beads as well as the sintered plates 11, 12. The nitrobenzene used was initially of "Analar" purity, having an initial resistivity of 8.1×10$^5$ ohm-metre.

Thus used is made of the increased resistivity of polar liquids arising after de-ionisation in this way to provide a Kerr electro-optical cell which is effective at higher applied electrical fields than conventional Kerr cells.

Two wwindows 18, 20 are provided in opposite walls of the cell 10 to admit radiation R through the central compartment 14 in a direction perpendicular to the direction of the applied electric field E. If the radiation R incident on the cell 10 is plane-polarised in a plane inclined at 45° to the plane of the applied electric field E and the radiation emerging from the cell 10 is passed through an analyser 21 having its axis of polarisation perpendicular to the plane of polarisation of the incident radiation, then the intensity I of the radation transmtted through the analyser 21 is related to the applied field E as follows:

$$I = \frac{I_i}{2} \sin^2 [\pi K E^2 l]$$

where:

$I_i$=intensity of incident radiation;
$K$=Kerr constant;
$l$=radiation path length in cell 10.

This relation is illustrated graphcally in FIG. 5. It will be seen that the intensity I is an increasingly sensitive function of the applied field E as the latter increases.

Therefore at higher applied fields E the variation in intensity resulting from a given change of field E (that is, of applied voltage) is relatively greater than that at lower applied fields. Referring to FIG. 5, if the first intensity maximum occurs at a field $E=E_m$, then at a field $E=5E_m$ a change of 2 percent in the field E is sufficient to cause a change in intensity I from a maximum to a minimum.

Using a dialysis Kerr cell 10 of the type shown in FIG. 2 electric fields E as high as 80–100 Kv./cm. may be applied to de-ionised liquid in the central compartment 14 before breakdown occurs. Thus in a typical cell 10 containing nitrobenzene and having an optical path length $l$ of 2 cm., an electrode spacing of 0.5 cm., and an applied voltage between the electrodes of 60 kv., a superimposed voltage charge of only 60 volts would produce a 5 percent change in the intensity I of the light output, which is readily detectable.

If the analyser 21 were removed, the emergent radiation would be polarisation-modulated, rather than intensity-modulated.

FIG. 4 illustrates a modification of the Kerr cell of FIG. 2 in which only one of the electrodes (the cathode 17) is surrounded by ion exchange beads and has associated therewith a sintered glass filter plate 12, the other electrode (anode 16) being a simple stainless steel or platinum electrode.

A practical embodiment of the cell of FIG. 4 is shown in section in FIG. 4a corresponding component parts being indicated by the same reference indices.

The liquid used in the cells of FIGS. 2 and 4 is nitrobenzene although other liquids having a high Kerr constant K, such, for example as ethyl acetamide, could be used provided they were found to be capable of de-ionisation by the electro-dialysis method. Where nitrobenzene is used it should, before being used in the cell 10, be processed in an ion exchange column and molecular sieve. Alternatively, and preferably, the nitrobenzene should be distilled (preferably by triple vacuum distillation), since the electro-dialysis mechanism is not completely effective with respect to all the impurities present, and especially with respect to the nitro-phenols. The ion exchange beads used in the cell are conveniently of the A.M.F. or A60 or C60 type. The sintered glass plates 11, 12 in this specific example are 1 to 2 mm. thick and have a porosity of 2 to 4.

FIG. 6 illustrates in schematic form one application of the electro-dialysis Kerr cell 10 of FIGS. 2 or 4 as a light modulating device. Light from a source L such as a sodium or mercury vapour lamp, a gallium-arsenide source, or laser, is plane polarised by a polariser P and then passed through an electro-dialysis Kerr cell K, the plane of polarisation of the polariser P being inclined at 45° to the electric field in the Kerr cell K. The applied electric field E in cell K is produced by applying an E.H.T. potential from a source G to one electrode $e$ of the cell K, the other electrode $e'$ of which is earthed. The voltage across the electrodes $e$, $e'$ is modulated by a relatively low voltage modulation generator M connected to the electrode $e$ to modulate the light beam emerging from the cell K, as described above. The modulated beam may be directed on to a photo-sensitive detector D such, for example, as a photomultiplier, at a distant station, where the modulation may be detected. The modulation generator M may alternatively be connected to the electrode $e'$, the latter being connected to earth through a resistor across which the modulation voltage is developed. Less power would be drawn from the modulation generator M in this way.

Existing methods for modulating light beams, such as laser beams, are either unable to operate over a wide frequency range or, as in the case of the Pockels cell, require very high modulation voltages. The modulation system using the cell of the present invention does not possess these disadvantages.

In one such optical communications system the detector D would be located at a distant receiving station and it would be necessary to align the beam emergent from the cell K with the detector. Using a laser source of sensibly parallel light it would be possible to locate the detector D at a considerable distance from the cell K. The light emergent from the cell K would be polarisation-modulated and the detector D would be responsive thereto. Alternatively, the light emergent from the cell K could be passed through an analyser A (shown in broken lines) which is crossed with respect to the polariser P and the resultant intensity-modulated light transmitted to the distant detector D via a light pipe employing, for example, fibre optics. The use of a light pipe avoids interference due to atmospheric conditions such as rain and also permits transmission of the modulated light over an indirect path.

The optical communications system employing the invention could be used in any system in which modulation of a light beam over a relatively wide frequency range is called for as, for example, in photographic processes and television systems.

FIG. 7 illustrates the application of the electro-dialysis Kerr cell K to a high voltage control circuit, in this case for the voltage supply to an electrostatic generator G. A voltage is applied to the generator G from terminals T—T through a series control circuit C. The electrodes of the Kerr cell K are connected across the terminals T—T, the Kerr cell K being disposed in a light-modulating arrangement similar to that of FIG. 6. Thus light from a steady source L is directed through the Kerr cell K and thence directly or via a light guide to a photo-electric detector D, as indicated in broken lines. The output of the detector D is used as a controlling signal for the control circuit C.

Any variation in the voltage applied to the generator G across terminals T—T will cause a change in the light output from the Kerr cell K which will in turn cause the detector D to apply to the control circuit C a control signal such as to produce an opposing change in the applied voltage. The arrangement therefore operates to maintain the voltage applied to the generator G constant.

Alternatively, if the light source L is modulated, the Kerr cell K may be used to superimpose a desired variation on the voltage applied to the generator G.

It will be noted that control and/or stabilisation of the high voltage parts of the circuit of FIG. 7 (enclosed in broken lines) is effected in this way by parts which are not electrically connected to the stabilising circuit S itself. Moreover, the system of FIG. 7 has a fast response to voltage variations up to many hundreds of megacycles/sec., thereby obviating the difficulties associated with the finite charge transfer time in electrostatic machines.

If the Kerr cell system of FIG. 7 detected unacceptably high voltage fluctuations this fact could be transmitted optically to a monitor (at ground potential) and a suitable correcting voltage could be applied to the source L to cause the high voltage circuit to trip open, to lower the voltage or to make some corrective action under the control of an operator or automatically.

The arrangement of FIG. 7 is also applicable to the control of voltage applied to electron microscopes, particle accelerators, neutron generators and similar high voltage devices. In such devices it is often necessary to operate at a precisely fixed voltage. In this case the voltage could be set at the desired value. By using the optical Kerr cell loop as a trimmer it would then be possible to choose a suitable light intensity maximum or minimum, by reference to FIG. 5. The device under control could then be caused to "lock" on to this maximum or minimum by use of an appropriate detector in the stabilisation circuit. For this purpose it would be possible to build suitable Kerr cells K capable of operating at applied voltages of the order of, or possibly exceeding, 400 kv.

In FIG. 8 there is shown an electro-dialysis cell 24 which may be used in the apparatus of FIG. 6 in substitution for the cell K therein.

In the cell 24 of FIG. 8, the cathode 25 is mounted within a cathode compartment 26, the cathode compartment 26 having a base 27 which is screw threaded or bonded with adhesive into an annular member 28, the base 27 and annular member 28 being formed of insulating material such as polytetrafluoroethylene.

The annular member 28 has a shoulder 30 which engages a sintered glass member 31, the latter being mounted within the cathode compartment 26. The sintered glass member 31 is spaced from the cathode 25 by a layer 32 of ion exchange material.

The cell 24 has an anode 33 which is not contacted by ion exchange material, windows 34, 35, and an inter-electrode space 36 which is filled with the liquid. Thus, as will be appreciated, the sintered glass member 31 forms a permeable member which separates the inter-electrode space 36 from the layer 32 of ion exchange material which contacts the cathode 25.

If a laser or other beam 37 is passed through windows 34, 35 of the cell so as to pass closely adjacent to the anode 33 which is not provided with the ion exchange material, this beam will be influenced by the space charge effects which occur adjacent to the anode 33, and it is found that a very small change in applied voltage produces a very considerable change in light transmission.

By using an applied D.C. field which is approximately equal to that required to produce the first zero transmission point beyond the first maximum transmission point, the light transmission/applied voltage curve is extremely steep for a beam which is close to the electrode 33 which is not provided with the ion exchange material. This, however, is not the case if the beam 37 is moved so that it passes through the centre of the cell, where little or no field distortion takes place due to the space charge.

Accordingly if the beam 37 is disposed as shown in FIG. 8 and the cell 24 has a short optical path with a relatively low voltage (e.g. 40 kv. for an optical path length of 1 cm.) the beam 37 may be modulated with a modulating voltage of the order of 1 kv.

Alternatively the cell 24 of FIG. 8 could be replaced by a similar cell in which the electrodes 25, 33 are made the anode and cathode respectively, but which in all other respects is the same as that shown in FIG. 8.

A further alternative is to employ the cell 40 of FIG. 9 in substitution for the cell 24 of FIG. 8 when the latter is used as described above.

The cell 40 has a base member 41 which is internally threaded to receive an inverted cup-shaped member 42. A further cup-shaped member 43 is mounted closely within the cup-shaped member 42 and contacts the base member 41. An anode 44 and a cathode 45 are closely mounted respectively within the cup-shaped members 42, 43.

A sintered glass member 46 is retained between the cup-shaped member 43 and a shoulder 47 of the cup-shaped member 42. A layer 48 of ion exchange material contacts the cathode 45 and is retained in place by the sintered glass member 46, the latter forming a permeable member which separates an inter-electrode space 50, which contains the liquid in the cell, from the layer 48 of ion exchange material.

The members 41, 42, 43 are formed of an insulating material such as polytetrafluoroethylene, the threaded connection between the members 41, 42 enabling the sintered glass member 46 to be forced against the shoulder 47.

The cell has windows 51 (only one shown), and, as in the FIG. 8 construction, the beam passing therethrough passes closely adjacent to the anode 44 so as to be influenced by the space charge effects.

I claim:

1. An electro-dialysis Kerr cell comprising two spaced apart electrodes; ion exchange material which surrounds at least one of said electrodes; at least one permeable member for separating an inter-electrode space in the cell from said ion exchange material, said permeable member being made of a material other than an ion-exchange material; a liquid in said inter-electrode space which displays the Kerr electro-optical effect; said ion-exchange material promoting de-ionisation of the said liquid; and windows in opposite walls of the cell for permitting transmission through said inter-electrode space of a beam of polarised radiation.

2. A cell as claimed in claim 1 in which the ion exchange material contacts only one electrode.

3. A cell as claimed in claim 1 in which ion exchange material contacts each electrode, said material at the negative electrode being cationic and the said material at the positive electrode being anionic when a voltage is applied between said electrodes.

4. A cell as claimed in claim 1 in which the ion exchange material comprises a plurality of synthetic resin members.

5. A cell as claimed in claim 4 in which the said permeable member is formed of sintered material.

6. Apparatus for modulating a beam of polarised radiation comprising an electro-dialysis cell according to claim 1, means for applying a steady voltage between the electrodes to provide a steady electric field in said electro-optical liquid contained in the cell, the cell windows transmitting polarised radiation to be modulated through said liquid with the plane of polarisation of said radiation at a predetermined angle to said field therein, and a modulation oscillator for superimposing on the steady voltage applied to the electrodes an oscillating modulation voltage, whereby the radiation after transmission through the cell is polarisation-modulated.

7. Apparatus as claimed in claim 6 in which a polarising device is disposed in the path of radiation entering the cell with its axis of polarisation inclined at 45° to the direction of the electric field in said cell, and an analyser device having its axis of polarisation perpendicular to that of said polarising device is disposed in the path of radiation leaving the cell, whereby the radiation transmitted through the analyser device in use of the apparatus is intensity-modulated.

8. Apparatus as claimed in claim 6 in which the applied steady voltage is between 40 kilovolts and 400 kilovolts.

9. Apparatus for modulating a beam of polarised radiation comprising an electro-dialysis cell according to claim 2; means for applying a steady voltage between the electrodes to provide a steady electric field in said liquid contained in the cell; a modulation oscillator for superimposing on the steady voltage applied to the electrodes an oscillating modulation voltage, whereby the radiation after transmission through the cell is polarisation-modulated; and means for passing the said polarised radiation through said electro-optical liquid adjacent to the electrode which is not contacted by the ion exchange material so as to be influenced by the space charge effects which occur adjacent to said electrode.

10. High voltage control apparatus comprising an electro-dialysis cell according to claim 1 comprising a source of plane polarised radiation which directs the radiation through said electro-optical liquid in the cell, the plane of polarisation being disposed at approximately 45° to the electric field therein; photo-electric detector means for receiving said radiation after transmission through the cell and through an analyser device the axis of polarisation of which is perpendicular to the plane of polarisation of the said radiation on entering the cell; and a voltage regulating circuit which, in response to a change in the electrical output of the detector means, changes the voltage applied to the said electrodes in a sense to cause an opposing change in the said electrical output.

11. Control apparatus as claimed in claim 10 in which the said radiation source is modulated so as to apply a predetermined fluctuation to the voltage to be controlled.

12. Control apparatus as claimed in claim 10 in which the said radiation source is a steady source so that the regulating circuit stabilises the voltage to be controlled at a predetermined value.

(References on following page)

References Cited

UNITED STATES PATENTS

| | | | |
|---|---|---|---|
| 3,443,856 | 5/1969 | Felici et al. | 350—150 |
| 3,443,857 | 5/1969 | Warter | 350—150 |
| 3,444,062 | 5/1969 | Felici et al. | 350—150 X |

OTHER REFERENCES

Jenkins and White: "Fundamentals of Optics," 3d ed. (McGraw-Hill Book Company, Inc., New York, 1957), pp. 604–605 relied on.

DAVID SCHONBERG, Primary Examiner

P. R. MILLER, Assistant Examiner

U.S. Cl. X.R.

204—301